United States Patent
Ito

(10) Patent No.: US 10,489,950 B2
(45) Date of Patent: Nov. 26, 2019

(54) DISPLAY CONTROL DEVICE FOR DISPLAYING A CAPTURED IMAGE OF A VEHICLE PERIPHERY

(71) Applicant: AISIN SEIKI KABUSHIKI KAISHA, Kariya-shi, Aichi-ken (JP)

(72) Inventor: Kota Ito, Obu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/690,355

(22) Filed: Aug. 30, 2017

(65) Prior Publication Data

US 2018/0061105 A1 Mar. 1, 2018

(30) Foreign Application Priority Data

Aug. 31, 2016 (JP) ................. 2016-168692

(51) Int. Cl.
*G06T 11/60* (2006.01)
*G06T 7/70* (2017.01)
(Continued)

(52) U.S. Cl.
CPC ............. *G06T 11/60* (2013.01); *B60R 1/00* (2013.01); *G06T 7/20* (2013.01); *G06T 7/292* (2017.01); *G06T 7/70* (2017.01); *H04N 7/183* (2013.01); *B60R 2300/30* (2013.01); *B60R 2300/305* (2013.01); *G06T 2207/10016* (2013.01);
(Continued)

(58) Field of Classification Search
None
See application file for complete search history.

(56) References Cited

U.S. PATENT DOCUMENTS

2006/0280249 A1* 12/2006 Poon ................ G06T 5/003
375/240.16
2013/0176329 A1 7/2013 Toyoda et al.
(Continued)

FOREIGN PATENT DOCUMENTS

JP 2005-318546 A 11/2005
JP 2005318546 A * 11/2005
(Continued)

OTHER PUBLICATIONS

Communication dated Jan. 19, 2018, from European Patent Office in counterpart application No. 17188261.6.

*Primary Examiner* — Sarah Le
(74) *Attorney, Agent, or Firm* — Sughrue Mion, PLLC

(57) ABSTRACT

A display control device includes: an image acquisition unit acquiring a plurality of captured image data in a time series of output from an imagining unit imaging a periphery of a vehicle; an object detection unit detecting an object with respect to each of the plurality of captured image data; a movement calculation unit calculating a movement direction and speed of the object; a display information determination unit determining a position of display information corresponding to the object, displayed on a display area of second captured image data output from the imagining unit after the plurality of captured image data, based on the movement direction and speed; and a display controller causing a display unit to display the second captured image data, and to superimpose and display the display information on the display area based on the determined position.

6 Claims, 9 Drawing Sheets

(51) Int. Cl.
*G06T 7/20* (2017.01)
*B60R 1/00* (2006.01)
*H04N 7/18* (2006.01)
*G06T 7/292* (2017.01)

(52) U.S. Cl.
CPC ............... *G06T 2207/30241* (2013.01); *G06T 2207/30261* (2013.01)

(56) References Cited

U.S. PATENT DOCUMENTS

| | | | |
|---|---|---|---|
| 2014/0293020 A1* | 10/2014 | Uehara | H04N 13/0477 348/51 |
| 2015/0187386 A1* | 7/2015 | Hayashi | G11B 27/005 386/230 |
| 2017/0046959 A1 | 2/2017 | Nakai | |

FOREIGN PATENT DOCUMENTS

| | | |
|---|---|---|
| JP | 5218910 B2 | 6/2013 |
| JP | 5338273 B2 | 11/2013 |
| WO | 2015/174093 A1 | 11/2015 |

\* cited by examiner

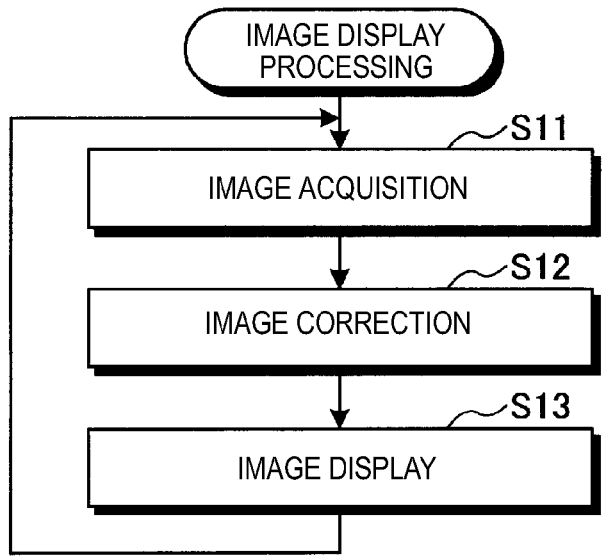
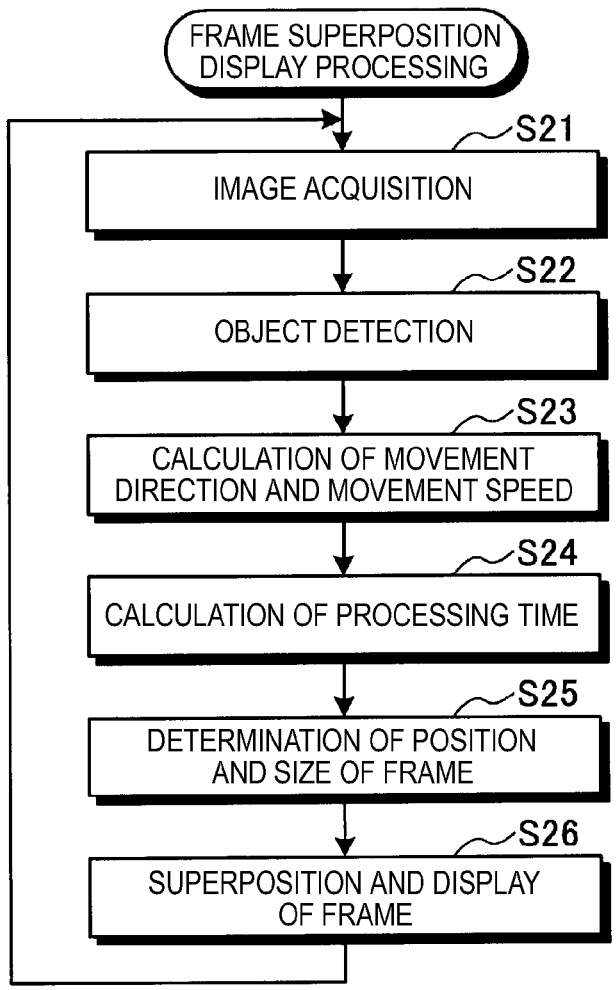

DISPLAY CONTROL DEVICE FOR DISPLAYING A CAPTURED IMAGE OF A VEHICLE PERIPHERY

CROSS REFERENCE TO RELATED APPLICATIONS

This application is based on and claims priority under 35 U.S.C. § 119 to Japanese Patent Application 2016-168692 filed on Aug. 31, 2016, the entire contents of which are incorporated herein by reference.

TECHNICAL FIELD

This disclosure relates to a display control device.

BACKGROUND DISCUSSION

Conventionally, there is a technology for displaying a captured image of the periphery of a vehicle on a display device of the vehicle. A driver may know the situation around the vehicle (e.g., the presence or absence of an object (another vehicle or the like)) by looking at the display image. In addition, there is also a technology for superimposing and displaying, on such a display image, display information corresponding to a captured object (e.g., a frame surrounding the object) (see, e.g., JP Patent No. 5218910 (Reference 1)).

However, compared with the time interval (e.g., 33 ms) for acquiring the captured image in the technology described above, the processing time taken from detection of the object from the captured image to determination of the position of the display information is long (e.g., 5 to 10 times the time interval). Therefore, when at least one of the vehicle and the object moves so that the object moves on the display image, there is a problem in that the movement of the display information is delayed with respect to the movement of the object.

Thus, a need exists for a technology which is not susceptible to the drawback mentioned above.

SUMMARY

A display control device according to an aspect of this disclosure includes: an image acquisition unit that acquires a plurality of captured image data in a time series of output from an imagining unit that images a periphery of a vehicle; an object detection unit that detects an object with respect to each of the plurality of captured image data; a movement calculation unit that calculates a movement direction and a movement speed of the object; a display information determination unit that determines a position of display information corresponding to the object, which is displayed on a display area of second captured image data output from the imagining unit after the plurality of captured image data, based on the movement direction and the movement speed; and a display controller that causes a display unit to display the second captured image data, and to superimpose and display the display information on the display area based on the determined position.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view illustrating an example of a state where a portion of a vehicle compartment of a vehicle of an embodiment is seen through;

FIG. 9 is a flowchart illustrating an example of an image display processing in the embodiment;

FIG. 10 is a flowchart illustrating an example of a frame superposition display processing according to the embodiment;

DETAILED DESCRIPTION

Hereinafter, an exemplary embodiment disclosed herein will be described. The configuration of the embodiment disclosed hereinafter, and the action, result and effect caused by the configuration are given by way of example. This disclosure is also able to be realized by a configuration other than the configuration disclosed in the following embodiments, and it is possible to obtain at least one of various effects or derivative effects based on the basic configuration.

A vehicle 1 (own vehicle) of the present embodiment may be, for example, a vehicle that uses an internal combustion engine (not illustrated) as a drive source, i.e. an internal combustion engine vehicle, a vehicle that uses an electric motor (not illustrated) as a drive source, i.e. an electric vehicle, a fuel cell vehicle or the like, a hybrid vehicle that uses both the internal combustion engine and the electric motor as a drive source, or a vehicle that is provided with any other drive source. In addition, the vehicle 1 may be equipped with various transmissions, and may be equipped with various devices required to drive an internal combustion engine or an electric motor, for example, systems, elements or the like. In addition, the type, the number, the layout, etc. of the devices related to the driving of wheels 3 in the vehicle 1 may be set in various ways.

Figure 1:
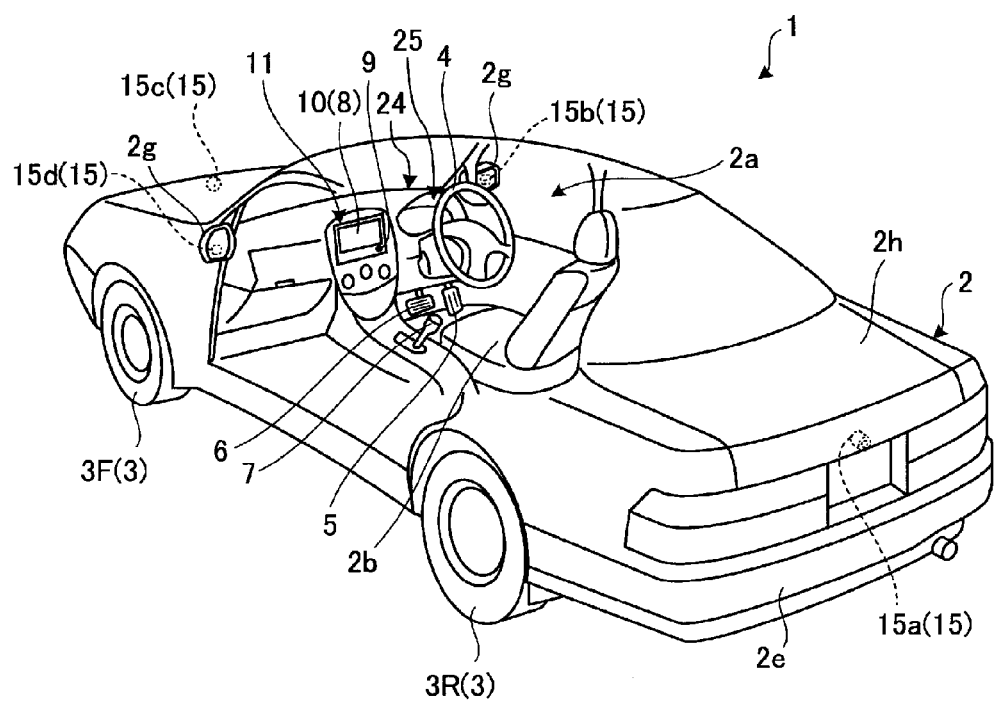
Figure 2:
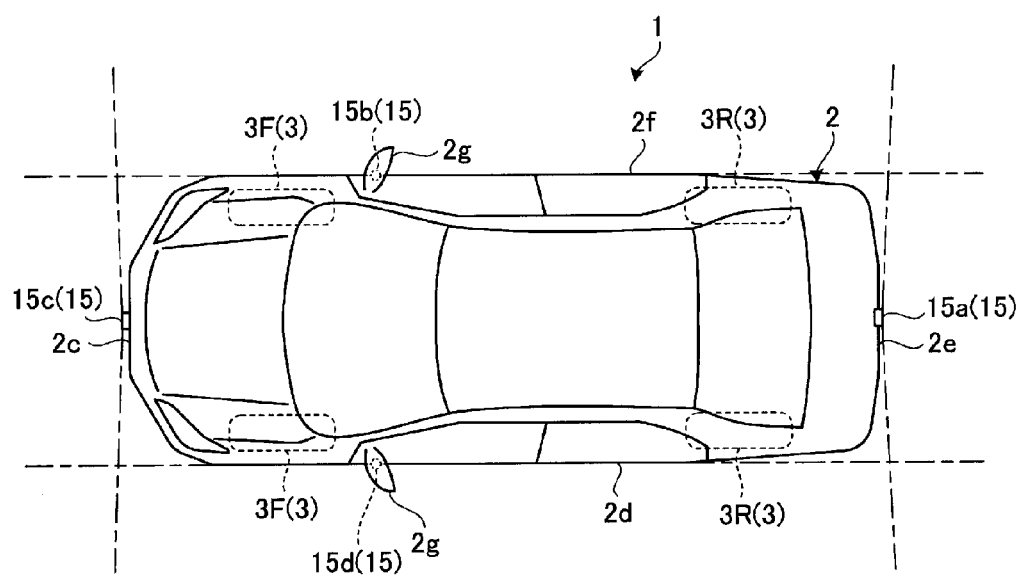
FIG. 2 is a plan view (bird's-eye view) illustrating an example of the vehicle of the embodiment.

FIG. 1 is a perspective view illustrating an example of a state where a portion of a vehicle compartment of the vehicle 1 of an embodiment is seen through. FIG. 2 is a plan view (bird's-eye view) illustrating an example of the vehicle 1 of the embodiment. As illustrated in FIG. 1, a vehicle body 2 configures a vehicle compartment 2a in which an occupant (not illustrated) rides. In the vehicle compartment 2a, a steering unit 4, an acceleration operation unit 5, a braking operation unit 6, a transmission operation unit 7, etc. are provided in a state of facing a seat 2b of a driver as the occupant.

The steering unit 4 is, for example, a steering wheel that protrudes from a dashboard 24. The acceleration operation unit 5 is, for example, an accelerator pedal located under the driver's foot. The braking operation unit 6 is, for example, a brake pedal located under the driver's feet. The transmission operation unit 7 is, for example, a shift lever that protrudes from a center console. In addition, the steering unit 4, the acceleration operation unit 5, the braking operation unit 6, the transmission operation unit 7, and so on are not limited thereto.

In addition, in the vehicle compartment 2a, a display device 8 as a display output unit, or a sound output device 9 as a sound output unit is provided. The display device 8 is, for example, a liquid crystal display (LCD), an organic electro-luminescence display (OLED), or the like. The sound output device 9 is, for example, a speaker. In addition, the display device 8 is covered with, for example, a transparent operation input unit 10 such as a touch panel.

The occupant may view an image displayed on a display screen of the display device 8 through the operation input unit 10. In addition, the occupant may perform an operation input by touching, pushing, or moving the operation input unit 10 with a finger or the like at a position that corresponds to the image displayed on the display screen of the display device 8. The display device 8, the sound output device 9, the operation input unit 10, and so on are provided, for example, in a monitor device 11, which is located in a center portion of the dashboard 24 in the vehicle width direction, i.e. in the left-and-right direction.

The monitor device 11 may include an operation input unit (not illustrated) such as a switch, a dial, a joystick, or a push button. In addition, a sound output device (not illustrated) may be provided at another position in the vehicle compartment 2a different from that of the monitor device 11, and sound may be output from both the sound output device 9 of the monitor device 11 and the other sound output device. The monitor device 11 is also used, for example, as a navigation system or an audio system. In addition, a display device 12 is provided in the vehicle compartment 2a, separately from the display device 8.

Figure 3:
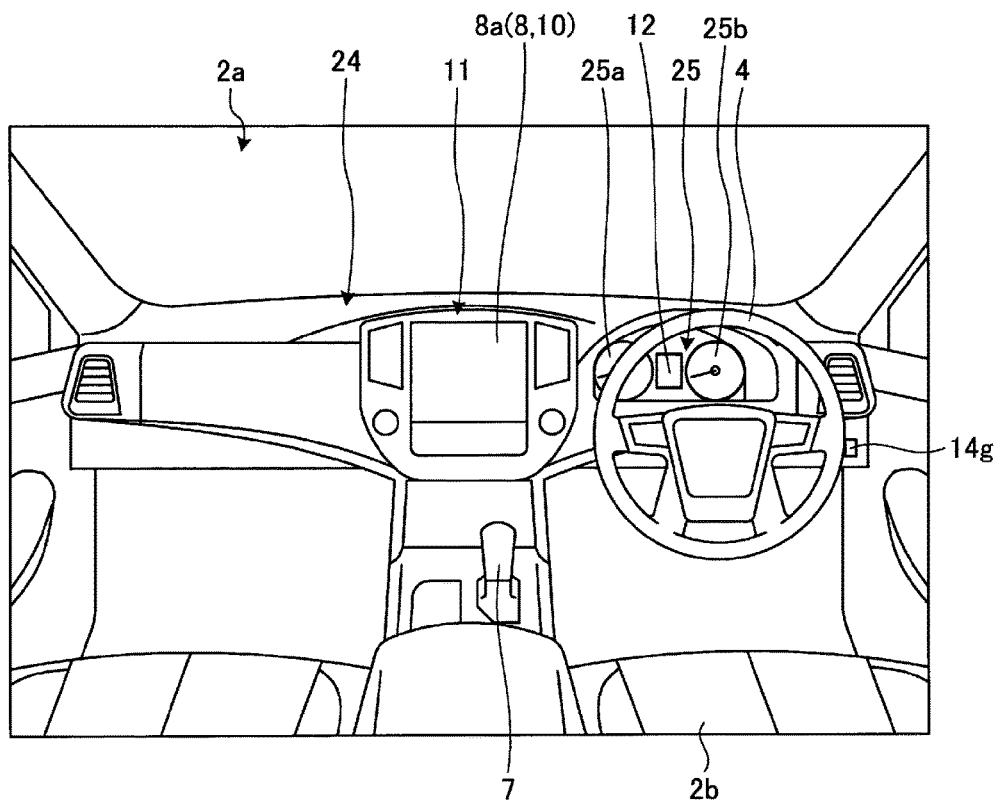
FIG. 3 is a view illustrating an example of a dashboard of the vehicle of the embodiment when viewed from the rear side of the vehicle.

FIG. 3 is a view illustrating an example of the dashboard 24 of the vehicle 1 of the embodiment when viewed from the rear side of the vehicle 1. As illustrated in FIG. 3, the display device 12 is provided on, for example, an instrument panel element 25 of the dashboard 24 and is disposed between a speed display element 25a and an RPM display element 25b at substantially the center of the instrument panel element 25. The size of a screen of the display device 12 is smaller than the size of a screen 8a of the display device 8. On the display device 12, an image that indicates information regarding parking assistance of the vehicle 1 is mainly displayed. The amount of information displayed on the display device 12 may be smaller than the amount of information displayed on the display device 8. The display device 12 is, for example, an LCD, an OELD, or the like. The information displayed on the display device 12 may be displayed on the display device 8.

In addition, as illustrated in FIGS. 1 and 2, the vehicle 1 is, for example, a four-wheeled automobile, and includes two left and right front wheels 3F and two left and right rear wheels 3R. All of the four wheels 3 are configured to be steerable.

Figure 4:
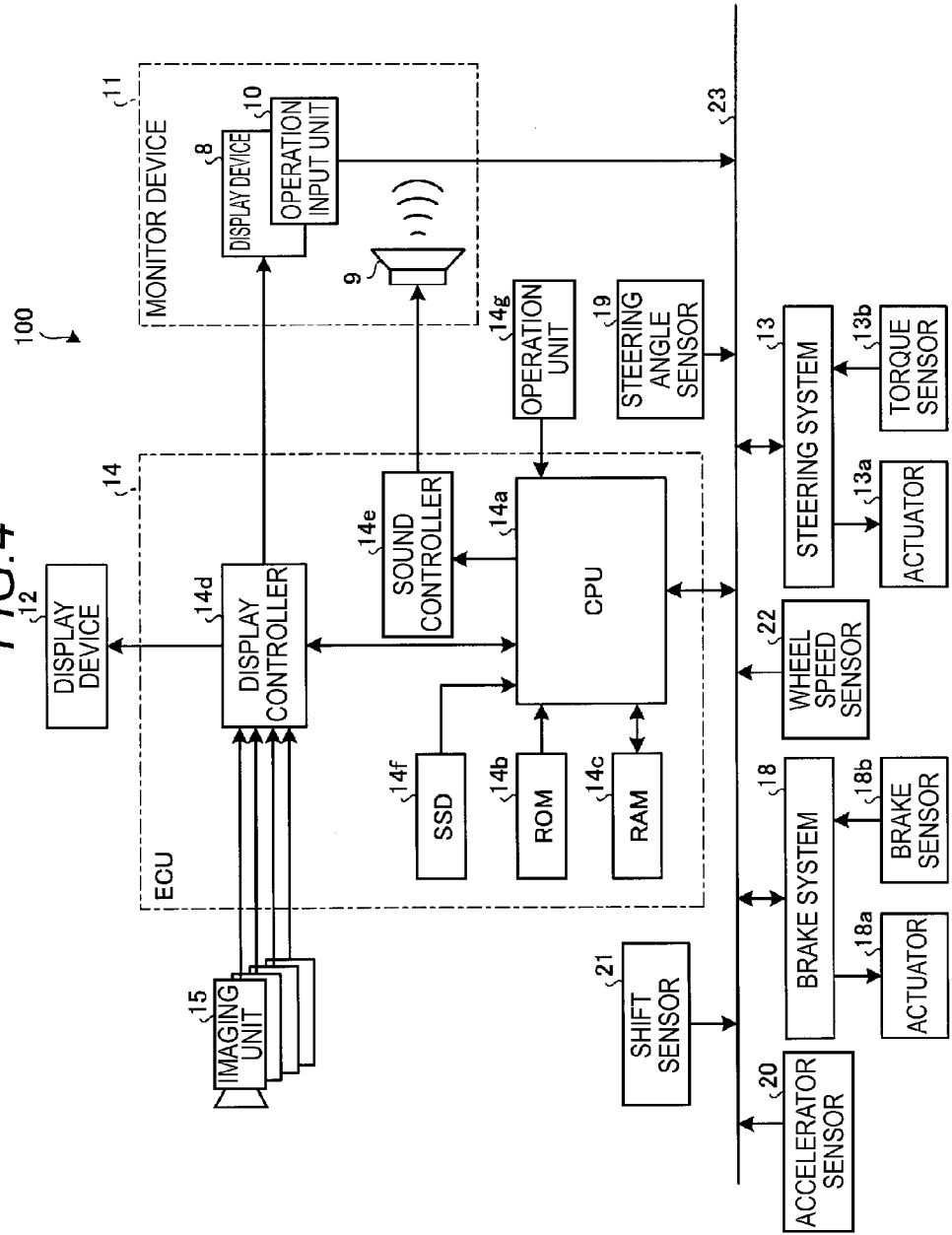
FIG. 4 is a block diagram illustrating an example of a configuration of a vehicle control system of the embodiment.

FIG. 4 is a block diagram illustrating an exemplary configuration of a vehicle control system 100 of the embodiment. As illustrated in FIG. 4, the vehicle 1 includes the vehicle control system 100. The vehicle control system 100 includes a display control device.

As illustrated in FIG. 4, the vehicle 1 includes a steering system 13, which steers at least two wheels 3. The steering system 13 includes an actuator 13a and a torque sensor 13b.

The steering system 13 is electrically controlled by an electronic control unit (ECU) 14 or the like, and operates the actuator 13a. The steering system 13 is, for example, an electric power steering system, a steer by wire (SBW) system, or the like. The steering system 13 supplements the steering force by adding a torque, i.e. an assistance torque to the steering unit 4 by the actuator 13a, or steers the wheels 3 by the actuator 13a. In this case, the actuator 13a steers, for example, two wheels 3. In addition, the torque sensor 13b detects, for example, a torque applied to the steering unit 4 by the driver.

In addition, as illustrated in FIG. 2, the vehicle body 2 is provided with a plurality of imaging units 15, for example, four imaging units 15a to 15d. The imaging units 15 are, for example, a digital camera that incorporates therein an imaging element such as a charge coupled device (CCD), or a CMOS image sensor (CIS). The imaging units 15 may output moving image data at a predetermined frame rate. Each of the imaging units 15 may have a wide-angle lens or a fisheye lens, and may image, for example, a range of 140° to 190° in the horizontal direction. The imaging units 15 sequentially image an exterior environment around the vehicle body 2 including the road surface on which the vehicle 1 is movable and the area in which the vehicle 1 may park, and output the same as captured image data.

The imaging unit 15a is located, for example, on the rear end 2e of the vehicle body 2, and installed on a wall portion below a door 2h of a rear trunk. The imaging unit 15b is located, for example, on the right end 2f of the vehicle body 2 and installed on a right door mirror 2g. The imaging unit 15c is located, for example, on the front side of the vehicle body 2, i.e. on the front end 2c in the vehicle front-and-rear direction, and installed on a front bumper, or the like. The imaging unit 15d is located, for example, on the left side of the vehicle body 2, i.e. on the left end 2d in the vehicle width direction, and installed on the door mirror 2g that is a protrusion on the left side.

The ECU 14 executes a calculation processing or an image processing based on the captured image data or the like obtained by the imaging units 15 (details will be described later).

In addition, as illustrated in FIG. 4, in the vehicle control system 100, a brake system 18, a steering angle sensor 19, an accelerator sensor 20, a shift sensor 21, a wheel speed sensor 22, and so on are electrically connected via an in-vehicle network 23 as an electric communication line, in addition to the ECU 14, the monitor device 11, the steering system 13, and so on.

The in-vehicle network 23 is configured as, for example, a controller area network (CAN). The ECU 14 may control the steering system 13, the brake system 18, and so on by sending a control signal through the in-vehicle network 23. In addition, the ECU 14 may receive the detection results of the torque sensor 13b, the brake sensor 18b, the steering angle sensor 19, the accelerator sensor 20, the shift sensor 21, the wheel speed sensor 22, and so on, or an operation signal of the operation input unit 10 and so on via the in-vehicle network 23.

The ECU 14 may include, for example, a central processing unit (CPU) 14a, a read only memory (ROM) 14b, a random access memory (RAM) 14c, a display controller 14d, a sound controller 14e, a solid state drive (SSD) (or a flash memory) 14f, and so on.

The CPU 14a may read a program, which is installed and stored in a nonvolatile storage device such as the ROM 14b, and may execute a calculation processing according to the program. The RAM 14c temporarily stores various data used in the calculation processing in the CPU 14a. In addition, the display controller 14d mainly executes an image processing using the captured image data obtained by the imaging units 15 or synthesis of image data displayed on the display device 8, among the calculation processings in the ECU 14. In addition, the sound controller 14e mainly executes a processing of sound data output from the sound output device 9, among the calculation processings in the ECU 14. In addition, the SSD 14f is a rewritable nonvolatile storage unit, and may store data even when a power supply of the ECU 14 is turned off. In addition, the CPU 14a, the ROM 14b, the RAM 14c, and so on are integrated in the same package. In addition, instead of the CPU 14a, the ECU 14 may be configured to use another logical operation processor such as a digital signal processor (DSP) or a logic circuit. In addition, instead of the SSD 14f, other storage devices such as a hard disk drive (HDD) and an electrically erasable programmable read only memory (EEPROM) may be provided, and the SSD 14f, the HDD, the EEPROM, and so on may be provided separately from the ECU 14. In addition, the operation unit 14g is configured by, for example, a push button, a switch or the like, and outputs an operation signal when an operation related to parking assistance or the like is performed by the driver or the like.

The brake system 18 includes, for example, an anti-lock brake system (ABS) that suppresses the lock of a brake, an electronic stability control (ESC) device that suppresses side slip of the vehicle 1 during cornering, an electric brake system that increases a brake force (that executes brake assistance), a brake by wire (BBW), and so on.

The brake system 18 applies a braking force to the wheels 3 (the vehicle 1) via the actuator 18a. In addition, the brake system 18 may execute various controls by detecting the lock of a brake, the idling of the wheels 3, the signs of side slip, and so on from a difference in rotation between the right and left wheels 3, or the like. The brake sensor 18b is, for example, a sensor that detects the position of a movable element of the braking operation unit 6. The brake sensor 18b may detect the position of a brake pedal as the movable element of the braking operation unit 6. The brake sensor 18b includes a displacement sensor.

The steering angle sensor 19 is, for example, a sensor that detects the amount of steering of the steering unit 4 such as a steering wheel. The steering angle sensor 19 is configured using, for example, a Hall element or the like. The ECU 14 acquires the amount of steering of the steering unit 4 by the driver, the amount of steering of each wheel 3 at the time of automatic steering or the like from the steering angle sensor 19, and executes various controls. In addition, the steering angle sensor 19 detects the rotation angle of a rotating element included in the steering unit 4. The steering angle sensor 19 is an example of an angle sensor.

The accelerator sensor 20 is, for example, a sensor that detects the position of a movable element of the acceleration operation unit 5. The accelerator sensor 20 may detect the position of an accelerator pedal as the movable element. The accelerator sensor 20 includes a displacement sensor.

The shift sensor 21 is, for example, a sensor that detects the position of a movable element of the transmission operation unit 7. The shift sensor 21 may detect the position of a lever, an arm, a button or the like as the movable element of the transmission operation unit 7. The shift sensor 21 may include a displacement sensor, or may be configured as a switch.

The wheel speed sensor 22 is a sensor that detects the amount of rotation of the wheels 3 or the number of revolutions per minute (RPM). The wheel speed sensor 22 outputs, as a sensor value, a wheel speed pulse number that indicates a detected RPM. The wheel speed sensor 22 is configured using, for example, a Hall element or the like. The ECU 14 calculates the amount of movement of the vehicle 1 or the like based on the sensor value acquired from the wheel speed sensor 22, and executes various controls. In addition, the wheel speed sensor 22 may be provided in the brake system 18 in some cases. In that case, the ECU 14 acquires the detection result of the wheel speed sensor 22 via the brake system 18.

In addition, the configurations, arrangements, electrical connection forms, and so on of the above-described various sensors or actuators are merely given by way of example, and may be set (changed) in various ways.

In the present embodiment, the ECU 14 implements at least a part of functions as a display control device as hardware and software (control programs) cooperate with each other.

Figure 5:
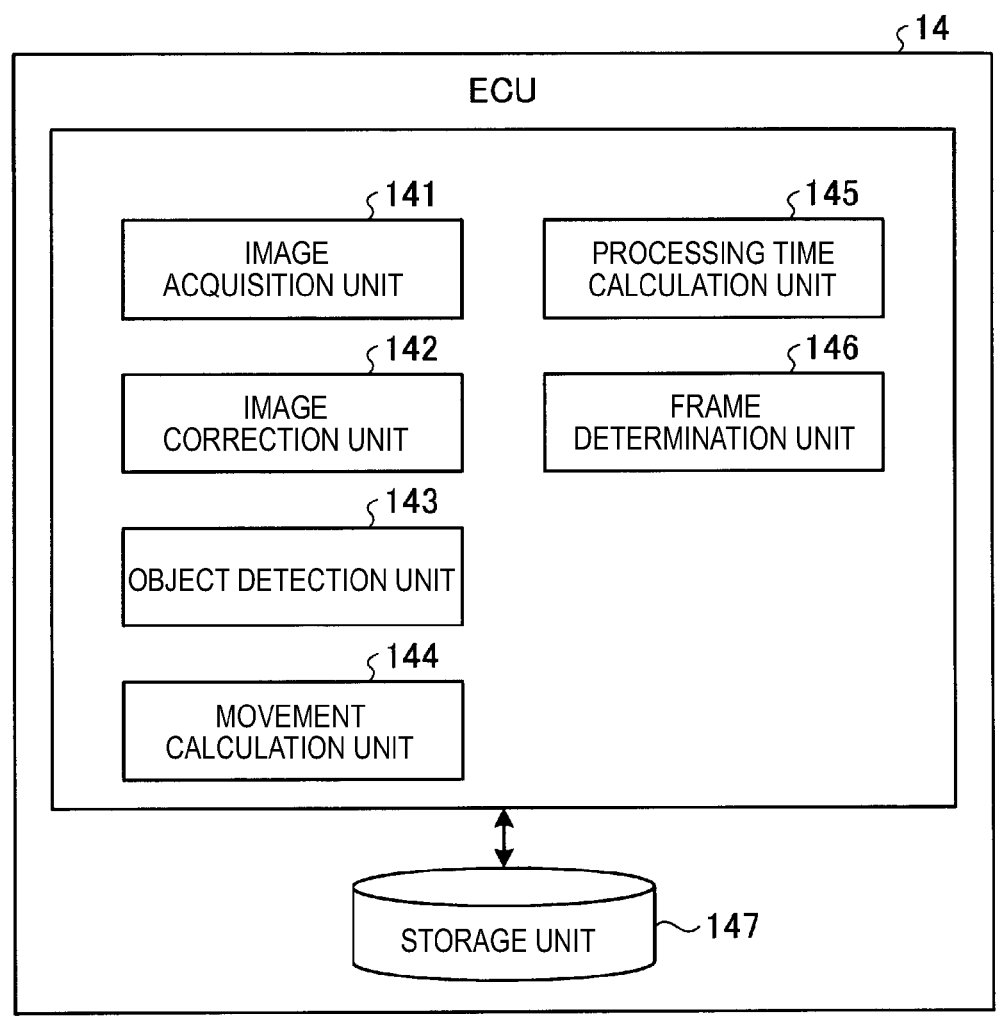
FIG. 5 is a block diagram illustrating a functional configuration of an example of an ECU of the embodiment.

FIG. 5 is a block diagram illustrating a functional configuration of an example of the ECU 14 of the embodiment. As illustrated in FIG. 5, the ECU 14 functions as an image acquisition unit 141, an image correction unit 142, an object detection unit 143, a movement calculation unit 144, a processing time calculation unit 145, a frame determination unit 146, and a storage unit 147. The storage unit 147 stores data used for the calculation in the ECU 14 and data calculated by the calculation in the ECU 14. Hereinafter, a frame surrounding an object will be described as an example of display information corresponding to an object in a display image.

The image acquisition unit 141 acquires a plurality of captured image data in a time series of output from the imaging units 15, which image the periphery of the vehicle 1, at a predetermined time interval (e.g., 33 ms). The image correction unit 142 performs correction of brightness or the like on the captured image data acquired by the image acquisition unit 141, in order to improve visibility or the like.

The object detection unit 143 detects an object with respect to each of the plurality of captured image data in a time series acquired by the image acquisition unit 141 based on a technology such as feature amount matching.

The movement calculation unit 144 calculates the movement direction and the movement speed of the object detected by the object detection unit 143. For example, the movement calculation unit 144 may calculate the movement direction and the movement speed of an object in a display area from the movement of the object in the display area based on the plurality of captured image data in a time series described above. Hereinafter, such a processing by the movement calculation unit 144 will be referred to as a "two-dimensional processing".

In addition, for example, the movement calculation unit 144 forms a virtual three-dimensional coordinate space for displaying a relative positional relationship between the vehicle 1 and the object based on the plurality of captured image data in a time series. In addition, the movement calculation unit 144 may calculate the movement direction and the movement speed of the object from the relative movement of the object on the basis of the vehicle 1 in the three-dimensional coordinate space. As a detailed example, since the captured image data is two-dimensional information, by using the road surface information of the captured image data as a condition that defines a horizontal plane, the relative positional relationship between the vehicle 1 and the object may be displayed in a three-dimensional coordinate space, and the movement direction and the movement speed of the object may be calculated. In addition, the movement direction and the movement speed of the object may be calculated from the movement of the object in the three-dimensional coordinate space by calculating, for example, a three-dimensional point group of the object by a stereoscopic image processing. Here, the stereoscopic image processing is an image processing technology for determining the three-dimensional coordinates of a subject based on the principle of triangulation using two or more images obtained by imaging the same subject at different angles. Hereinafter, such a processing by the movement calculation unit 144 will be referred to as a "three-dimensional processing."

The processing time calculation unit 145 calculates the processing time required to determine the position of a frame from the plurality of captured image data in a time series. In addition, a fixed time (e.g., 200 ms) may be used instead of calculating such a processing time.

The frame determination unit 146 (an example of a display information determination unit) determines the position and the size of a frame corresponding to an object in a display area of second captured image data output from the imaging units 15 after the plurality of captured image data in a time series described above, based on the movement direction and the movement speed calculated by the movement calculation unit 144.

In addition, when the processing time calculation unit 145 calculates the processing time, the frame determination unit 146 determines the position and the size of the frame based on the movement direction and the movement speed calculated by the movement calculation unit 144 and the processing time.

Figure 6:
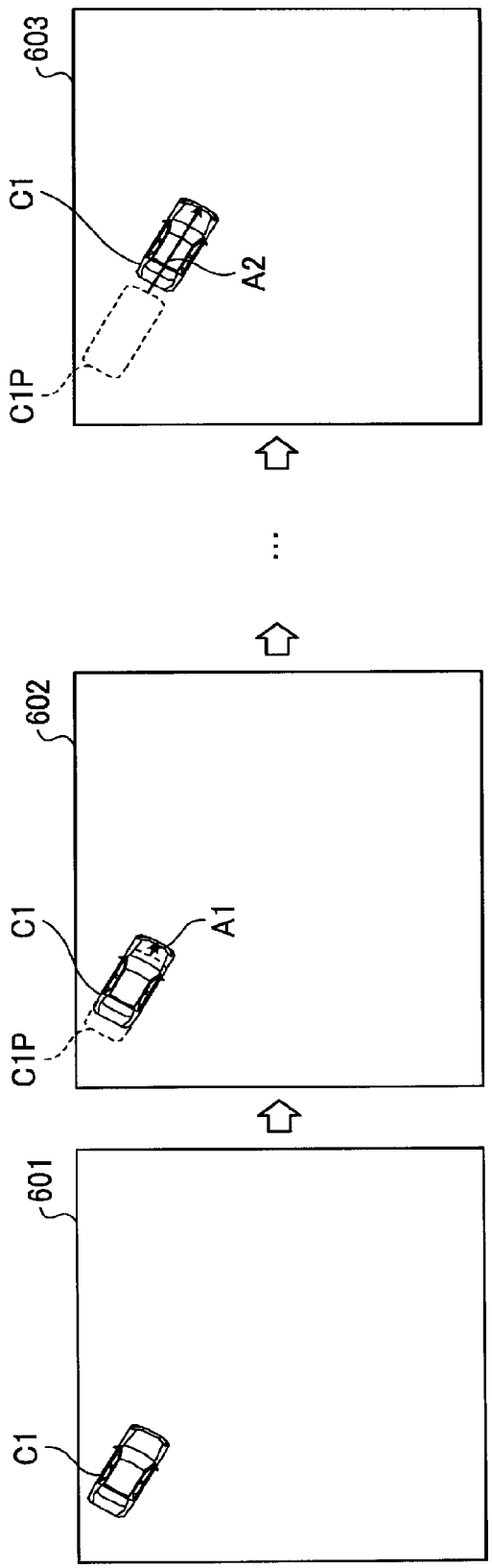
FIG. 6 is an explanatory view illustrating the outline of the principle of a processing of determining the position of a frame corresponding to an object based on the movement direction and the movement speed of the object from a plurality of captured image data in a time series in the embodiment.

Here, the outline of the processing principle of the movement calculation unit 144 and the frame determination unit 146 will be described with reference to FIG. 6. FIG. 6 is an explanatory view illustrating the outline of the processing principle of determining the position of a frame corresponding to an object based on the movement direction and the movement speed of the object from a plurality of captured image data in a time series. Here, of a "two-dimensional processing" and a "three-dimensional processing" by the movement calculation unit 144, a description will be made on a "two-dimensional processing." However, the description is also applicable to a "three-dimensional processing."

For example, captured image data 601 and captured image data 602 schematically display a plurality of captured image data in a time series acquired by the image acquisition unit 141. The captured image data 602 is acquired after (immediately after) the captured image data 601. The movement calculation unit 144 calculates the movement direction and the movement speed of another vehicle C1 (an example of an object) based on the captured image data 601 and the captured image data 602. Here, the movement direction means the direction of movement of an object in a display area of the captured image data. In addition, the movement speed means the speed of movement of the object in the display area of the captured image data. That is, based on a difference in captured time between the captured image data 601 and the captured image data 602 and the movement direction and the movement speed of the other vehicle C1 between the captured image data 601 and the captured image data 602, that is, a vector A1 indicated in the captured image data 602, the movement direction and the movement speed of the other vehicle C1 may be calculated. In addition, reference numeral C1P in the captured image data 602 indicates the position of the other vehicle C1 in the captured image data 601.

In addition, the frame determination unit 146 determines the position of a frame corresponding to an object displayed in a display area of the second captured image data (captured image data 603) output from the imagining units 15 after the plurality of captured image data (the captured image data 601 and 602) in the time series described above, based on the movement direction and the movement speed calculated by the movement calculation unit 144. For example, the difference in captured time between the captured image data 601 and the captured image data 603 is N times (N is a number of, for example, about 5 to 10) the difference in captured time between the captured image data 601 and the captured image data 602. In this case, before actually acquiring the captured image data 603, the position of the other vehicle C1 in the captured image data 603 may be predicted as the position obtained by adding a vector A2, which is obtained by multiplying the vector A1 by N, to the position indicated by the reference numeral C1P. Accordingly, the position of the other vehicle C1 may be determined as the position of the frame corresponding to the other vehicle C1. In addition, the size of the frame may be determined in consideration of the size of the other vehicle C1 in the captured image data 601 and 602, a change in the distance from the own vehicle to the other vehicle C1, a change in the direction of the other vehicle C1, and the like.

In addition, the processing principle of the movement calculation unit 144 and the frame determination unit 146 is not limited thereto. For example, when the other vehicle C1 is turning, first, the movement calculation unit 144 calculates the turning of the other vehicle C1 from three or more captured image data in the time series acquired from the image acquisition unit 141. Then, the frame determination unit 146 may determine the position of the frame corresponding to the object displayed in the display area of the above-described second captured image data assuming that the other vehicle C1 continues the turning.

Returning back to FIG. 4, the display controller 14d displays the above-described second captured image data on the display device 8 (display unit), and superimposes and displays the frame in the display area based on the position and size determined by the frame determination unit 146. In the related art, a processing of superimposing a frame is performed after detecting an object using a captured image, so that the object and the frame deviate from each other by a processing time. On the contrary, in the present embodiment, deviation between the object and the frame may be prevented since the movement direction and the movement speed of an object are calculated after the object is detected and a frame is superimposed on the object in consideration of the movement direction and the movement speed.

Figure 7:
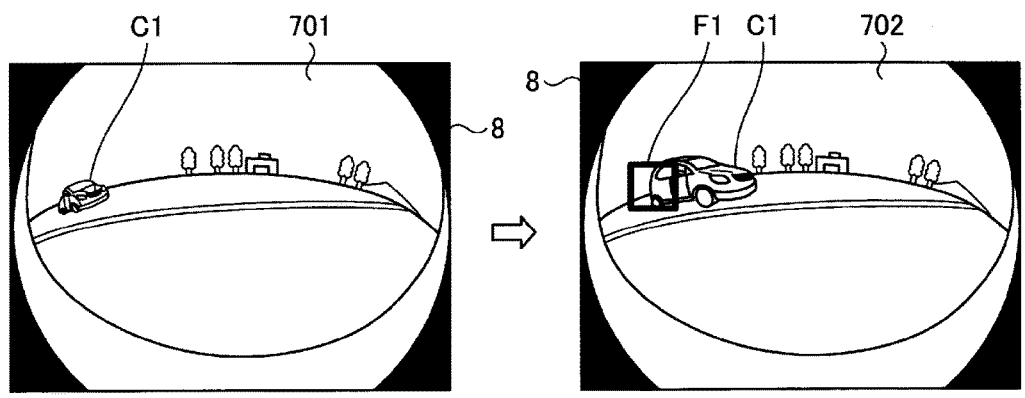
FIG. 7 is a view illustrating a screen example that displays a moving object and a frame corresponding to the object in a comparative example (the related art)
Figure 8:
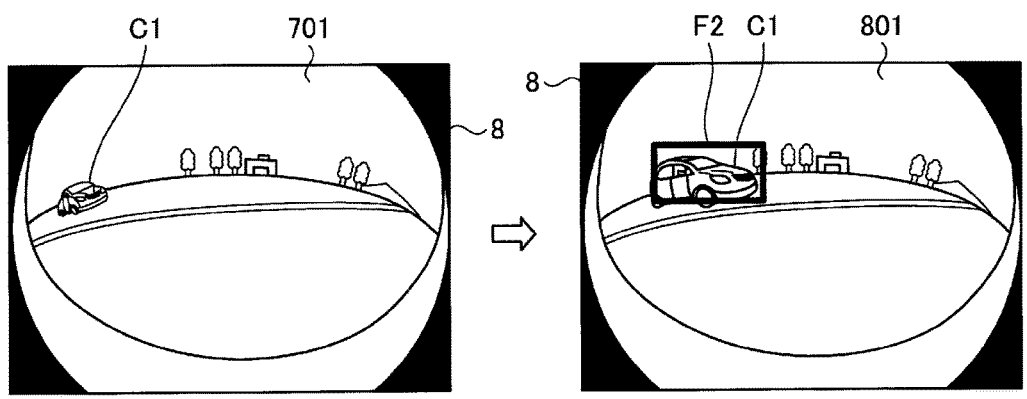
FIG. 8 is a view illustrating a screen example that displays a moving object and a frame corresponding to the object in the embodiment.
Figure 11:
FIG. 11 is a diagram illustrating an example of display information.
Figure 12:
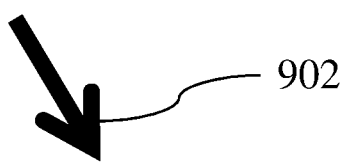
FIG. 12 is a diagram illustrating an example of display information.

Next, prior to describing a processing of the embodiment with reference to FIGS. 9 and 10, a screen example according to a comparative example (the related art) and a screen example according to the embodiment is described using FIGS. 7 and 8, in order to facilitate the understanding of the processing of the embodiment. FIG. 7 is a view illustrating a screen example in which a moving object and a frame corresponding to the object are displayed according to the comparative example (the related art).

In FIG. 7, a screen 701 displayed on the display device 8 corresponds to the captured image data 601 of FIG. 6, and a screen 702 corresponds to the captured image data 603 of FIG. 6. Here, in the comparative example, the position of the frame is determined based on the captured image data 601 of FIG. 6 corresponding to the screen 701. However, in the screen 702 on which the frame is actually displayed, a frame F1 is displayed at a position deviated from the other vehicle C1 because the other vehicle C1 is moving.

Meanwhile, FIG. 8 is a view illustrating a screen example in which a moving object and a frame corresponding to the object are displayed in the embodiment. The screen 701 displayed on the display device 8 corresponds to the captured image data 601 of FIG. 6, and a screen 801 corresponds to the captured image data 603 of FIG. 6. Here, the frame determination unit 146 determines the position of the frame based on the captured image data 601 of FIG. 6 corresponding to the screen 701 and the captured image data 602 of FIG. 6 immediately thereafter. That is, when the frame determination unit 146 determines the position of the frame using the movement direction and the movement speed of the other vehicle C1, the frame F2 is displayed at an accurate position with respect to the other vehicle C1 on the screen 801 on which the frame is actually displayed.

Next, a processing of the embodiment will be described with reference to FIGS. 9 and 10. FIG. 9 is a flowchart illustrating an example of an image display processing in the embodiment. FIG. 10 is a flowchart illustrating an example of a frame superposition display processing in the embodiment. In addition, although the processing of FIG. 9 and the processing of FIG. 10 are executed in parallel, for example, the time required for a series of processing (a processing cycle) of FIG. 10 is, for example, 5 to 10 times the time required for a series of processing (a processing cycle) of FIG. 9.

As illustrated in FIG. 9, in an image display processing, first, in step S11, the image acquisition unit 141 acquires captured image data from the imaging units 15, which image the periphery of the vehicle 1. Next, in step S12, the image correction unit 142 performs correction of brightness or the like on the captured image data acquired by the image acquisition unit 141, in order to improve visibility or the like. Next, in step S13, the display controller 14d displays the image data corrected by the image correction unit 142 on the display device 8. After step S13, the processing returns to step S11.

Next, as illustrated in FIG. 10, in a frame superposition display processing, first, in step S21, the image acquisition unit 141 acquires the plurality of captured image data (e.g., captured image data 601 and 602 of FIG. 6) in a time series from the imaging units 15. Next, in step S22, the object detection unit 143 detects an object with respect to each of the plurality of captured image data.

Next, in step S23, the movement calculation unit 144 calculates the movement direction and the movement speed of the object detected by the object detection unit 143.

Next, in step S24, the processing time calculation unit 145 calculates the processing time required to determine the position of the frame from the plurality of captured image data. A fixed time (e.g., 200 ms or the like) may be used in the following processing without calculating such a processing time.

Next, in step S25, the frame determination unit 146 determines the position and the size of the frame corresponding to the object displayed in the display area of second captured image data output from the imaging units 15 after the plurality of captured image data in a time series described above, based on the movement direction and the movement speed calculated by the movement calculation unit 144 and the processing time (or the fixed time) calculated by the processing time calculation unit 145.

Next, in step S26, the display controller 14d superimposes and displays the frame in the display area of the second captured image data displayed on the display device 8 based on the position and the size determined by the frame determination unit 146 (the screen 801 of FIG. 8). After step S26, the processing returns to step S21.

As described above, according to the display control device of the present embodiment, the followability of the frame with respect to the moving object may be improved in a display image of the periphery of the vehicle by determining the position and the size of a frame corresponding to a moving object using the movement direction and the movement speed of the object calculated from a plurality of captured image data. That is, by predicting the distance along which the object moves while the processing of determining the position of the frame is performed, the frame may be displayed at an accurate position with respect to the object.

In particular, in a case where a plurality of objects is displayed on the display screen, when the position of the frame is not accurate with respect to a target object, there is a possibility that the driver erroneously recognizes correspondence between the object and the frame or erroneously recognizes the distance to the object. However, according to the display control device of the present embodiment, such erroneous recognition may be avoided since the frame may be displayed at an accurate position with respect to the object.

In addition, when the movement calculation unit 144 calculates the movement direction and the movement speed of the object in the display area from the movement of the object in the display area, the processing is lightly executed.

In addition, when the movement calculation unit 144 calculates the movement direction and the movement speed of the object from the movement of the object in a three-dimensional coordinate space, the movement direction and the movement speed of the object may be calculated with higher accuracy.

In addition, when the processing time calculation unit 145 calculates the processing time required to determine the position of the frame and the frame determination unit 146 determines the position and the size of the frame using the processing time, the position and the size of the frame may be determined according to the processing time.

Although the embodiment disclosed here has been described, this embodiment is given by way of example and is not intended to limit the scope of this disclosure. This novel embodiment may be implemented in various other forms and various omissions, substitutions, and changes may be made without departing from the gist of this disclosure. This embodiment and its modifications are included in the scope and gist of this disclosure and are included in this disclosure described in the claims and the equivalent scope thereof.

For example, although the frame surrounding an object has been described as display information corresponding to the object in the display image by way of example, this disclosure is not limited thereto and may be, for example, a representative point (901) corresponding to the object, an arrow (902) indicating the object, or the like. In the case of such a representative point (901) or an arrow (902), only the position may be determined without determining the size.

A display control device according to an aspect of this disclosure includes: an image acquisition unit that acquires a plurality of captured image data in a time series of output from an imagining unit that images a periphery of a vehicle; an object detection unit that detects an object with respect to each of the plurality of captured image data; a movement calculation unit that calculates a movement direction and a movement speed of the object; a display information determination unit that determines a position of display information corresponding to the object, which is displayed on a display area of second captured image data output from the imagining unit after the plurality of captured image data, based on the movement direction and the movement speed; and a display controller that causes a display unit to display the second captured image data, and to superimpose and display the display information on the display area based on the determined position. With this configuration, the followability of the display information with respect to the moving object may be improved by determining the position of the display information corresponding to the object using, for example, the movement direction and the movement speed of the moving object calculated from the plurality of captured image data, in the display image of the periphery of the vehicle.

The movement calculation unit may calculate the movement direction and the movement speed of the object in the display area from a movement of the object in the display area based on the plurality of captured image data. With this configuration, a processing is lightly executed by calculating the movement direction and the movement speed of the object from, for example, the movement of the object in the display area.

The movement calculation unit may calculate the movement direction and the movement speed of the object from a movement of the object in a three-dimensional coordinate space that displays a relative positional relationship between the vehicle and the object based on the plurality of captured image data. With this configuration, the movement direction and the movement speed of the object may be calculated with higher accuracy by calculating the movement direction and the movement speed of the object from the movement of the object in the three-dimensional coordinate space.

The display information determination unit may determine the position of the display information based on the movement direction, the movement speed, and a processing time required to determine the position of the display information from the plurality of captured image data. With this configuration, the position of the display information may be determined according to the processing time by determining the position of the display information using, for example, the processing time required to determine the position of the display information.

The display information may be a frame surrounding the object, the display information determination unit may determine a position and a size of the frame corresponding to the object in the display area of the second captured image data based on the movement direction and the movement speed, and the display controller may cause the display unit to display the second captured image data on the display unit and to superimpose and display the frame in the display area based on the determined position and size. With this configuration, the frame may be displayed at an appropriate position and size by using, for example, the frame surrounding the object as the display information and determining the position and the size of the frame based on the movement direction and the movement speed of the object.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A display control device comprising:
at least one processor configured to:
acquire a plurality of captured image data in a time series of output from a camera that images a periphery of a vehicle;
detect an object with respect to each of the plurality of captured image data;
calculate a movement direction and a movement speed of the object;
calculate a processing time of the at least one processor required to determine a position of display information from the plurality of captured image data, wherein the display information corresponds to the object and is displayed on a display area of second captured image data output from the camera after the plurality of captured image data;
determine the position of the display information corresponding to the object, which is displayed on the display area of the second captured image data output from the camera after the plurality of captured image data, based on the movement direction, the movement speed, and the processing time; and
cause a display screen to display the second captured image data, and to superimpose and display the display information on the display area based on the determined position.

2. The display control device according to claim 1, wherein the at least one processor calculates the movement direction and the movement speed of the object in the display area from a movement of the object in the display area based on the plurality of captured image data.

3. The display control device according to claim 1, wherein the at least one processor calculates the movement direction and the movement speed of the object from a movement of the object in a three-dimensional coordinate space that displays a relative positional relationship between the vehicle and the object based on the plurality of captured image data.

4. The display control device according to claim 1, wherein the display information is a frame surrounding the object,
the at least one processor determines a position and a size of the frame corresponding to the object in the display area of the second captured image data based on the movement direction and the movement speed, and
the at least one processor causes the display screen to display the second captured image data and to superimpose and display the frame on the display area based on the determined position and size.

5. A display control device according to claim 1, wherein the display information is a representative point corresponding to the object.

6. A display control device according to claim 1, wherein the display information is an arrow indicating the object.

* * * * *